United States Patent Office.

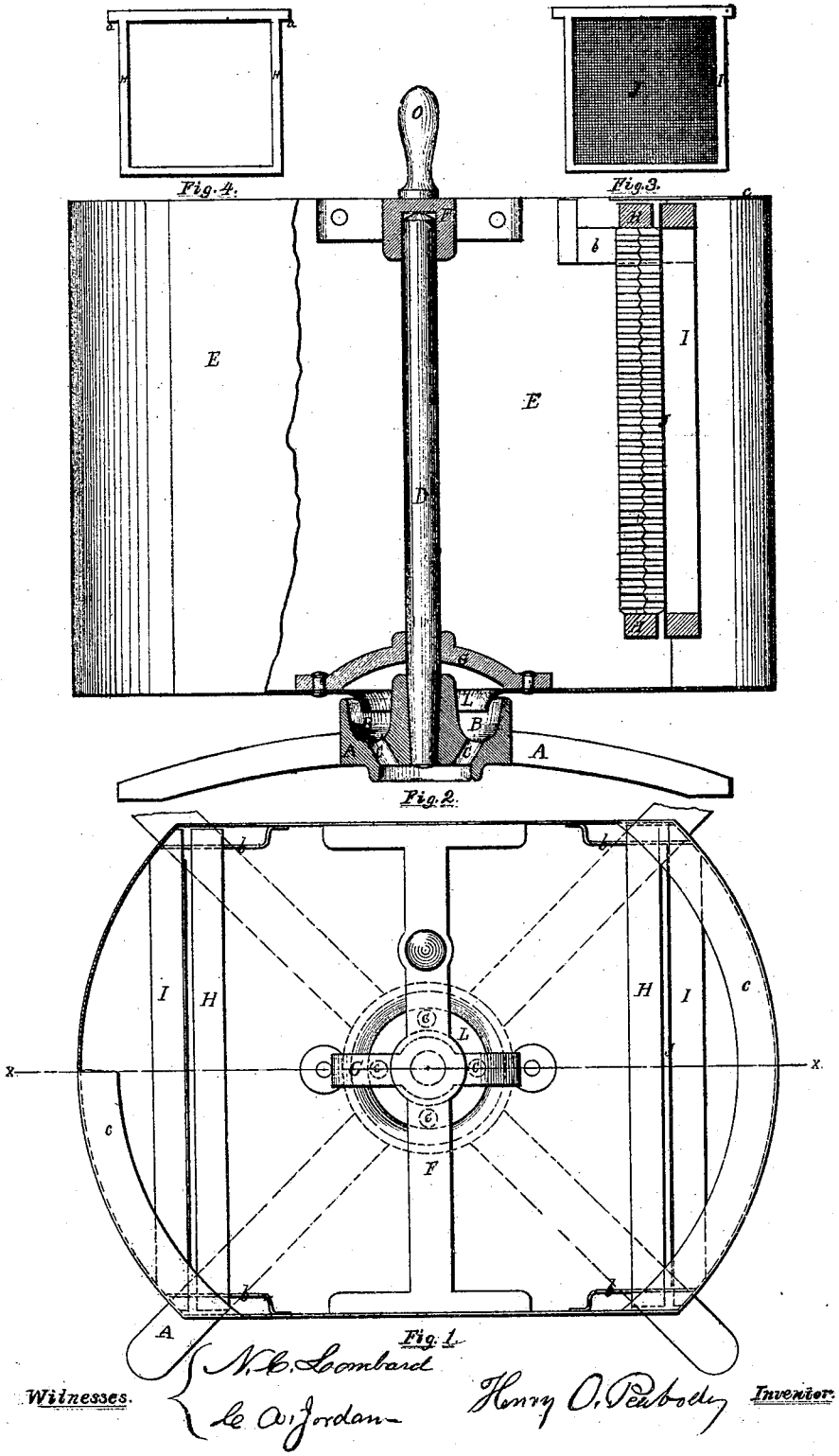

HENRY O. PEABODY, OF BOSTON, MASSACHUSETTS.

Letters Patent No. 96,142, dated October 26, 1869.

IMPROVED CENTRIFUGAL MACHINE FOR EXTRACTING HONEY FROM THE COMB.

The Schedule referred to in these Letters Patent and making part of the same.

I, HENRY O. PEABODY, of Boston, in the county of Suffolk, and State of Massachusetts, have invented certain new and useful Improvements in Centrifugal Machines, designed more especially for Extracting Honey from the Comb, of which the following is a specification.

The object of my invention is to provide a machine by the use of which honey may be extracted from the comb (without injury to the comb) that shall be cheap in construction, effective in its operation, and comparatively portable; and It consists, first, in the use of a light sheet-metal vessel, constructed of the proper form and mounted upon a central spindle, upon which it may revolve, so that, in combination with portable frames, covered with wire gauze, or a perforated plate, it shall serve the purpose of both the revolving basket and the stationary tub, to receive the liquid to be discharged, ordinarily used in centrifugal machines.

It also consists in the use, in a centrifugal machine, of frames, covered with wire gauze or a thin perforated plate of sheet-metal, so constructed and applied to the revolving vessel that it shall serve as a support to the honey-comb in the honey-frame, and allow of the passage of the liquid through the same into the space between it and the outer wall of the revolving vessel.

It also consists in providing said vessel with a central discharge-orifice, through which the honey may be drawn off into a suitable vessel provided for the purpose.

In the accompanying drawings—

Figure 1 is a plan of my improved machine, with a portion of the revolving vessel shown in section;

Figure 2 is a sectional elevation, the section of the right-hand portion being taken on the line x x on fig. 1, and showing the screen-frame and honey-frame in position;

Figure 3 is an elevation of the screen, drawn to a smaller scale; and

Figure 4 is an elevation of the honey-frame.

A is a base or stand, made of cast-iron, and provided with a central hub, in the top of which is formed an annular groove, B, from which open the discharge-orifices C C.

D is a spindle, set in the hub of the base A, upon which the light sheet-metal vessel E is hung by means of the cross-bar F and the yoke G, and around which it revolves.

The vessel E may be made of tin or any other thin sheet-metal that is not likely to corrode, of the form shown, or it may be circular, in which case three or four wire screens may be used, and the same number of honey-frames be put into the machine at the same time.

In the machine represented, only two honey-frames can be operated upon at the same time.

H is the honey-frame, constructed as represented, so that it may be suspended in the vessel E by resting the projections a a upon the lugs or rests b b.

I is the screen-frame, constructed like the honey-frame H, and suspended in the same manner from the rests b b.

J is the wire gauze with which one side of the frame I is covered.

c c are ledges forming a part of the vessel E, and projecting inward, so as to form a partial cover to the outer portion of said vessel, to prevent the honey from overflowing the vessel.

L is a central orifice in the vessel E, so formed by curving that portion of the bottom of said vessel immediately surrounding the orifice that the contents of said vessel shall be discharged into the annular groove B, and through the orifices C C.

D is the handle by which the machine is revolved.

The operation of my machine is as follows:

The wire-gauze frames I are placed in the position shown at either side of the machine, with the gauze or perforated plate toward the centre of the machine, and the frame containing the honey-comb, after the caps of the cells are removed, is placed in the vessel with one face of the comb resting against the gauze, when the machine is set in motion by means of the handle O, when the honey will be forced from the comb, and, passing through the wire gauze, will be deposited upon the outer wall of the vessel.

When the honey has all been discharged from one side of the comb, the honey-frame H is turned around so as to bring the other face of the comb against the wire gauze, when the previous operation is repeated.

Instead of using a single wire-gauze frame, a double one may be used, so constructed that the honey-frame could be placed between the two gauze screens, so that the whole might be raised out of the vessel and turned around, which would be a very desirable arrangement for extracting honey from broken comb.

When the machine is stopped, the honey will flow from the central opening L in the bottom of the vessel E into the annular groove B, and thence through the orifices C C into a vessel provided for the purpose, not shown in the drawings.

It is designed to construct the machine so that there shall be sufficient height between the floor and the under side of the base or stand A to introduce a vessel to receive the honey, or the legs of the base may be set upon blocks in the corners of the packing-box for the same purpose.

What I claim as new, and desire to secure by Letters Patent, is—

1. So constructing a centrifugal machine that a single revolving vessel shall serve the purpose of both the revolving basket and the stationary tub, as heretofore constructed, substantially as described.

2. The use, in centrifugal machines, of the portable wire gauze frames I, or their equivalents, constructed and applied substantially as described, for the purpose specified.

3. The combination, with the revolving vessel E, of the central opening L, the annular groove B, and the discharge orifices C C, substantially as described.

Executed at Boston, this 17th day of September, 1869.

HENRY O. PEABODY.

Witnesses:
N. C. LOMBARD,
C. A. JORDAN.